(12) United States Patent
Lee

(10) Patent No.: US 12,644,550 B2
(45) Date of Patent: Jun. 2, 2026

(54) AUTOMATIC CONNECTOR FOR SUPPLYING UTILITY

(71) Applicant: UNITEST INC, Yongin-si (KR)

(72) Inventor: Hyun Sung Lee, Hwaseong-si (KR)

(73) Assignee: UNITEST INC, Yongin-si (KR)

( * ) Notice: Subject to any disclaimer, the term of this patent is extended or adjusted under 35 U.S.C. 154(b) by 112 days.

(21) Appl. No.: 18/775,953

(22) Filed: Jul. 17, 2024

(65) Prior Publication Data

US 2025/0264176 A1 Aug. 21, 2025

(30) Foreign Application Priority Data

Feb. 21, 2024 (KR) ......................... 10-2024-0024980

(51) Int. Cl.
| | |
|---|---|
| *F16L 37/33* | (2006.01) |
| *F16L 29/04* | (2006.01) |
| *F16L 37/23* | (2006.01) |

(52) U.S. Cl.
CPC .............. *F16L 37/33* (2013.01); *F16L 29/04* (2013.01); *F16L 37/23* (2013.01); *Y10T 137/87949* (2015.04)

(58) Field of Classification Search
CPC . F16L 29/04; F16L 37/33; F16L 37/36; Y10T 137/87949; Y10T 137/87957
See application file for complete search history.

(56) References Cited

U.S. PATENT DOCUMENTS

| | | | | | |
|---|---|---|---|---|---|
| 2,451,218 | A | * | 10/1948 | Hengst ..................... | F16L 29/04 |
| | | | | | 137/614.04 |
| 2,471,798 | A | * | 5/1949 | Thomas ................... | F16L 29/04 |
| | | | | | 137/594 |
| 2,660,456 | A | * | 11/1953 | Meddock ............... | A01B 61/02 |
| | | | | | 285/317 |
| 2002/0179160 | A1 | * | 12/2002 | Arisato ................... | F16L 29/04 |
| | | | | | 137/614.03 |
| 2005/0085839 | A1 | | 4/2005 | Allen et al. | |
| 2015/0267850 | A1 | * | 9/2015 | Nowack .................. | F16L 37/32 |
| | | | | | 137/614.04 |
| 2017/0136551 | A1 | | 5/2017 | Graulich | |

(Continued)

FOREIGN PATENT DOCUMENTS

| | | |
|---|---|---|
| CN | 109996983 A | 7/2019 |
| JP | 2006-084280 A | 3/2006 |
| JP | 2014-154180 A | 8/2014 |

(Continued)

*Primary Examiner* — Robert K Arundale
(74) *Attorney, Agent, or Firm* — You & IP, LLC

(57) ABSTRACT

Proposed is an automatic coupler for supplying a utility. The automatic coupler includes a first coupling member provided on any one of a utility supplying end or a utility receiving end, and a first valve body provided in the first coupling member and provided with a first check ball elastically supported, a second coupling member provided on the other one of the utility supplying end or the utility receiving end and coupled to the first coupling member, and a second valve body provided in the second coupling member and provided with a second check ball elastically supported. The second valve body includes a main body, a first floating body, and a second floating body elastically supported to the first floating body, the second floating body elastically supporting the second check ball.

5 Claims, 7 Drawing Sheets

(56)                References Cited

U.S. PATENT DOCUMENTS

2019/0264586 A1     8/2019   Hoglund et al.

FOREIGN PATENT DOCUMENTS

| | | | |
|---|---|---|---|
| KR | 10-2000-0015678 | A | 3/2000 |
| KR | 10-1157812 | B1 | 6/2012 |
| KR | 10-2345639 | B1 | 12/2021 |
| TW | 521135 | B | 9/1990 |
| WO | 0231397 | A1 | 4/2002 |

* cited by examiner

AUTOMATIC CONNECTOR FOR SUPPLYING UTILITY

CROSS REFERENCE TO RELATED APPLICATION

The present application claims priority to Korean Patent Application No. 10-2024-0024980, filed Feb. 21, 2024, the entire contents of which are incorporated herein for all purposes by this reference.

BACKGROUND OF THE INVENTION

Field of the Invention

The present disclosure relates to an automatic coupler for connecting a pneumatic utility.

Description of the Related Art

Generally, various utilities such as air, nitrogen, vacuum, pure water (DW), power, and so on are required in a semiconductor manufacturing process, and it is very important to smoothly supply such utilities in the manufacturing process.

For example, in a packaging process of a semiconductor device, a unit semiconductor device is electrically tested after an assembly is completed by using a tester and a handler. The handler performs a mechanical operation by receiving an electrical signal, connects the semiconductor device to a contactor connected to the tester, and tests electrical characteristics of the semiconductor device. Furthermore, the handler classifies whether the semiconductor device is defective on the basis of the test result, and then unloads the semiconductor device to a semiconductor package carrier such as a tube or a tray.

Document of Related Art (Patent Document 1) Korean Patent Application Publication No. 10-2000-0015678 (published on Mar. 15, 2000)

SUMMARY OF THE INVENTION

An objective of the present disclosure is to provide an automatic coupler for supplying a utility, the automatic coupler being configured such that a leak between a utility supplying end for supplying a utility and a utility receiving end is prevented from occurring and a pneumatic connection is capable of being stably realized.

In order to achieve the objective of the present disclosure, there is provided an automatic coupler for supplying a utility, the automatic coupler including: a first coupling member provided on any one of a utility supplying end or a utility receiving end; a first valve body provided in the first coupling member and provided with a first check ball elastically supported, to perform an opening and closing of a flow path by the first check ball; a second coupling member provided on the other one of the utility supplying end or the utility receiving end and configured to be coupled to the first coupling member; and a second valve body provided in the second coupling member and provided with a second check ball elastically supported, to perform an opening and closing of a flow path by the second check ball, wherein the second valve body includes: a main body; a first floating body elastically supported to the main body; and a second floating body elastically supported to the first floating body so that a portion of the second floating body protrudes outside the first floating body, the second floating body elastically supporting the second check ball so that a portion of the second check ball protrudes outside the first floating body.

Preferably, the second valve body may be provided such that the second floating body protrudes by a predetermined height with respect to a contact surface of the first floating body in contact with the first valve body, and the second check ball may be provided to protrude higher than the height of the second floating body.

Preferably, the automatic coupler may further include a sealing member provided on at least one of two contact surfaces of the first valve body and the second valve body facing each other for maintaining airtightness.

Preferably, the automatic coupler may further include: a first elastic body elastically supporting the main body and the first floating body; a second elastic body elastically supporting the first floating body and the second floating body; and a third elastic body elastically supporting the second floating body and the second check ball, wherein an elastic modulus of the first elastic body may be larger than an elastic modulus of the second elastic body, and the elastic modulus of the second elastic body may be larger than an elastic modulus of the third elastic body.

Preferably, the second valve body may further include a valve stem fixed to the second floating body to support the third elastic body.

In the automatic coupler for supplying the utility of the present disclosure, the automatic coupler includes: the first coupling member provided on any one of the utility supplying end or the utility receiving end; the first valve body provided in the first coupling member and provided with the first check ball elastically supported, to perform the opening and closing of the flow path by the first check ball; the second coupling member provided on the other one of the utility supplying end or the utility receiving end and coupled to the first coupling member; and the second valve body provided in the second coupling member and provided with the second check ball elastically supported, to perform the opening and closing of the flow path by the second check ball, wherein the second valve body includes: the main body; the first floating body elastically supported to the main body; and the second floating body elastically supported to the first floating body so that the portion of the second floating body protrudes outside the first floating body, the second floating body elastically supporting the second check ball so that the portion of the second check ball protrudes outside the first floating body. Therefore, there is an effect of maintaining a stable pneumatic connection state by minimizing the possibility of a leak that may occur when the two valve bodies are connected to each other.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Specific structures and functions stated in the following embodiments of the present disclosure are exemplified to illustrate embodiments according to the spirit of the present disclosure and the embodiments according to the spirit of the present disclosure can be achieved in various ways. Furthermore, the present disclosure should not be construed as being limited to the following embodiments and should be construed as including all changes, equivalents, and replacements included in the spirit and scope of the present disclosure.

Hereinafter, the present disclosure will be described in detail with reference to the accompanying drawings.

Figure 1A:
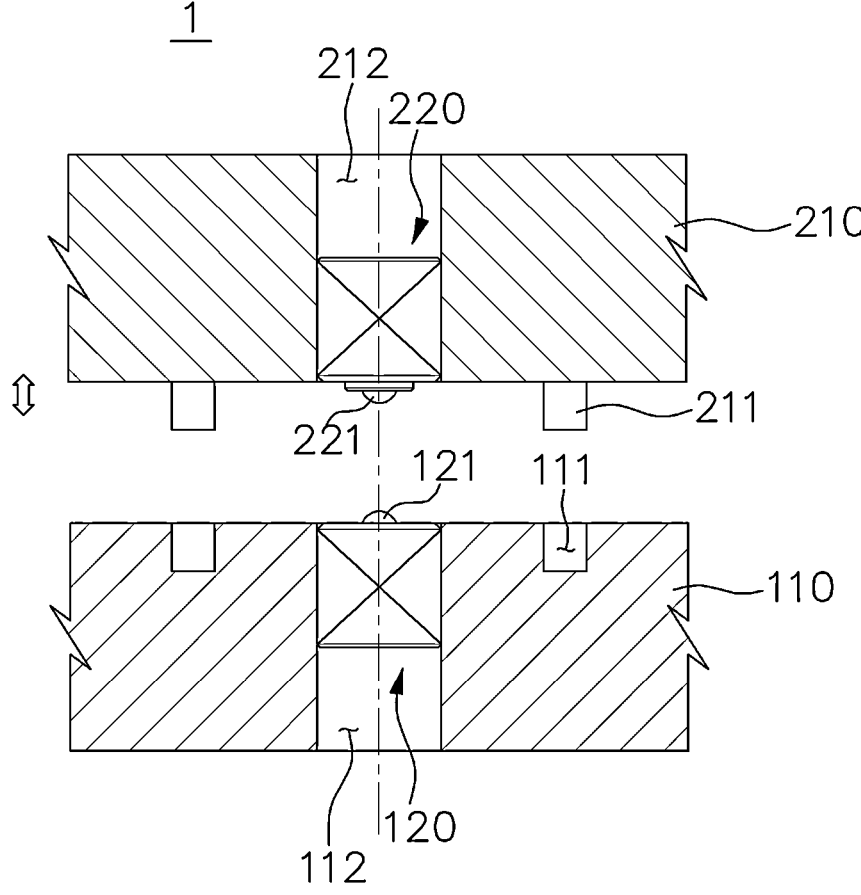
FIG. 1A and FIG. 1B are perspective views respectively illustrating a separated state and a connected state of an automatic coupler for supplying a utility according to an embodiment of the present disclosure.
Figure 1B:
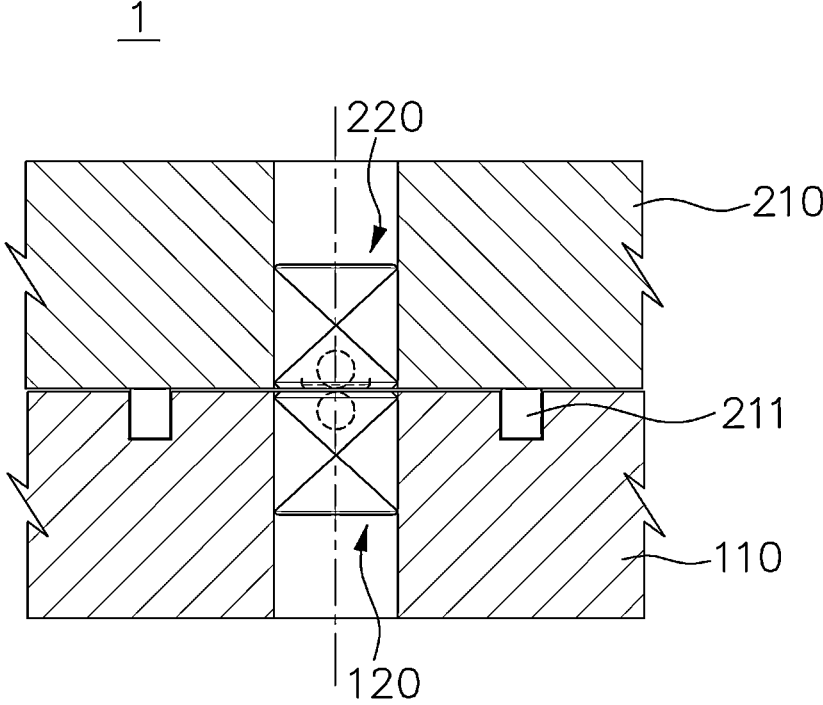

FIG. 1A and FIG. 1B are perspective views respectively illustrating a separated state and a connected state of an automatic coupler for supplying a utility according to an embodiment of the present disclosure.

Referring to FIG. 1A and FIG. 1B, an automatic coupler 1 for supplying a utility according to an embodiment of the present disclosure includes a first coupling member 110, a first valve body 120, a second coupling member 210, and a second valve body 220.

The first coupling member 110 and the second coupling member 210 are respectively provided at a utility receiving end and a utility supplying end, and may include respective coupling guide members in female and male forms. In the present embodiment, as the coupling guide members, a guide arm 211 that protrudes in a coupling direction from the second coupling member 210 and a guide groove 111 which is formed in the first coupling member 110 corresponding to the guide arm 211 and into which the guide arm 211 is inserted are illustrated. Such coupling guide members may be modified in various forms within a range in which the first coupling member 110 and the second coupling member 210 are capable of being coupled to each other. Meanwhile, although not illustrated, a separate locking member capable of mechanically fixing or releasing a coupling state of the first coupling member 110 and the second coupling member 210 may be added.

The first valve body 120 is provided in a first flow path 112 of the first coupling member 110, is provided with a first check ball 121 that is elastically supported, and the first flow path 112 is opened and closed by the first check ball 121. Preferably, the first check ball 121 is elastically supported within the first valve body 120 such that at least a portion of the first check ball 121 protrudes outside the first valve body 120.

The second valve body 220 is provided in a second flow path 212 of the second coupling member 210, is provided with a second check ball 221 that is elastically supported, and the second flow path 112 is opened and closed by the second check ball 221. Preferably, the second check ball 221 is elastically supported within the second valve body 210 such that at least a portion of the second check ball 221 protrudes outside the second valve body 220.

When the first coupling member 110 and the second coupling member 210 are in a state in which the first valve body 120 and the second valve body 220 are separated from each other, an air pressure is blocked by the check balls 121 and 221 of each of the first and second valve bodies 120 and

220. Meanwhile, when the first coupling member 110 and the second coupling member 210 are coupled to each other, the check balls 121 and 221 of each of the first and second valve bodies 120 and 220 are pushed inward, and the utility (air pressure) supplying end the utility (air pressure) receiving end are connected to each other.

Particularly, in the present disclosure, since a contact process of the first valve body 120 and the second valve body 220 has two stages, so that the possibility of a leak that may occur when the first valve body 120 and the second valve body 220 are connected to each other may be minimized.

Figure 2:
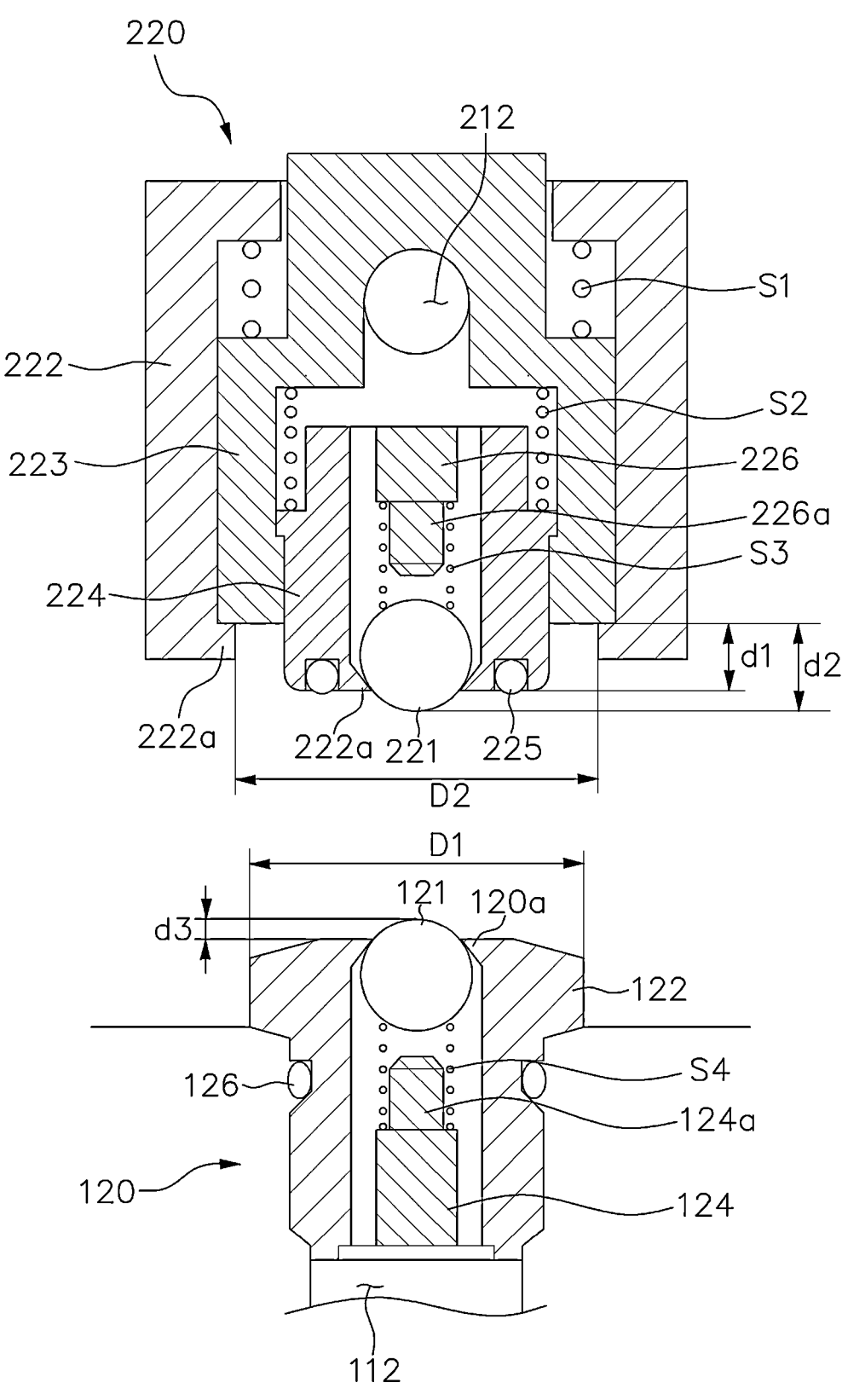
FIG. 2 is a cross-sectional view illustrating the automatic coupler for supplying the utility according to an embodiment of the present disclosure.

Hereinafter, a configuration of each valve body that is a main component of the present disclosure will be described in detail with reference to the drawings. FIG. 2 is a cross-sectional view illustrating the automatic coupler for supplying the utility according to an embodiment of the present disclosure.

Referring to FIG. 2, the second valve body 220 includes the second check ball 221, a main body 222, a first floating body 223, and a second floating body 224.

The main body 222 is formed in a hollow shape, forms the main external appearance of the second valve body 220, and is assembled with the second coupling member 210. The main body 222 is provided with a first elastic body S1 that elastically supports the first floating body 223, a first locking step 222a that is bent in an inner diameter direction is provided at the lower end of the main body 222, and the first floating body 223 which is inserted into the main body 222 and which is elastically supported on the first elastic body S1 has the lower end portion supported on the first locking body 222a. In the present embodiment, the second flow path 212 is provided inside the first floating body 223.

The second floating body 224 is inserted into the first floating body 223 and is elastically supported by a second elastic body S2, a second locking step 222a supporting the second check ball 221 is provided on the opening end outside the flow path, and the diameter of an opening portion on which the second locking step 222a is formed smaller than the diameter of the second check ball 221.

Such a second floating body 224 is provided such that the second floating body 224 is elastically supported on the first floating body 223 by the second elastic body S2 so that a portion of the second floating body 224 protrudes by a predetermined height d1 outside the first floating body 223. Furthermore, the second floating body 224 is provided with a third elastic body S3 such that the second check ball 221 is elastically supported so that a portion of the second check ball 221 protrudes outside the first floating body 223.

Preferably, the second floating body 224 further includes a first sealing member 225 for maintaining airtightness on a contact surface which faces and which is in contact with the first valve body 120. For example, such a first sealing member 225 may be provided as a well-known O-ring. Meanwhile, in the present embodiment, it is exemplified that the first sealing member 225 is provided in the second floating body 224, but the first sealing member 225 may be provided around the opening end of the first floating body 223 and may realize airtightness with the first valve body 120.

In such a second valve body 220, the first floating body 223 protrudes by the predetermined height d1 on the basis of the contact surface of the first floating body 223 in contact with the first valve body 120. In addition, the second check ball 221 protrudes by a predetermined height d2 that is higher than the protrusion height d1 of the first floating body 223 (d1<d2).

Preferably, the second valve body 220 further includes a first valve stem 226 which is fixed to the first floating body 223 and which is disposed on the flow path so as to support a third elastic body S3, and further includes a first guide stem 226*a* which extends from the first valve stem 226 and which is inserted into a portion of the third elastic body S3.

Preferably, the first elastic body S1 has an elastic modulus larger than the elastic modulus of the second elastic body S2, and the second elastic body S2 has an elastic modulus larger than the elastic modulus of the third elastic body S3. Therefore, when the second valve body 220 and the first valve body 120 are brought into contact with each other, the third elastic body S3, the second elastic body S2, and the second check ball 221 is inserted inside the second floating body 224 (compression of the third elastic body), and then the first floating body 223 is inserted inside the main body 222 (compression of the second elastic body and the third elastic body).

The first valve body 120 is formed in a hollow shape, configures the main external appearance of the first valve body 120, and is assembled with the first coupling member 110. Preferably, the first valve body 120 may be provided with a second sealing member 126 for maintaining airtightness of the first coupling member 110. In the first valve body 120, a second locking step 120*a* that support the first check ball 121 is provided on the opening end outside the flow path, and the diameter of the opening end on which the second locking step 120*a* is formed is smaller than the diameter of the first check ball 121. The first valve body 120 further includes a second valve stem 124 supporting a fourth elastic body S4, and may further include a second guide stem 124*a* which extends from the second valve stem 124 and which is inserted into a portion of the fourth elastic body S4.

Such a first valve body 120 is provided such that a portion of the first check ball 121 protrudes outside by a predetermined height d3 with respect to a contact surface with the second valve body 220.

Preferably, the first valve body 120 further includes a valve body head 122 which is coupled to the first coupling member 110 and which protrudes outward, and the outer diameter D1 of the valve body head 122 is smaller than the inner diameter D2 of the opening end of the main body 222.

FIG. 3 to FIG. 6 are cross-sectional views illustrating a connection process of the automatic coupler for supplying the utility according to an embodiment of the present disclosure.

The connection process of the automatic coupler for supplying the utility of the present disclosure as described above will be described with reference to FIG. 3 to FIG. 6. Furthermore, in order to facilitate understanding, it is described that the first valve body 120 is fixed and the second valve body 220 is moved so that the first valve body 120 and the second valve body 220 are connected to each other.

Figure 3:
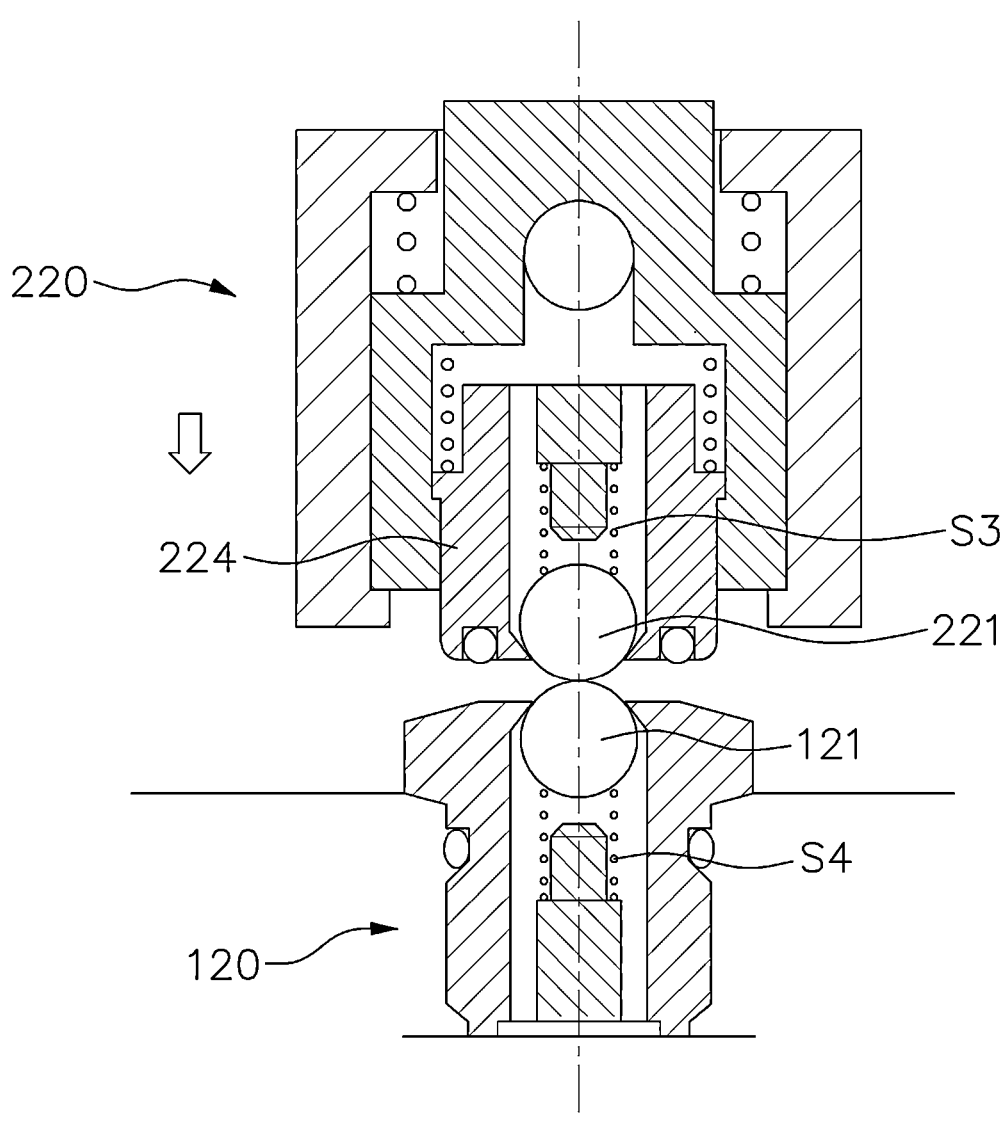
FIG. 3 to FIG. 6 are cross-sectional views illustrating a connection process of the automatic coupler for supplying the utility according to an embodiment of the present disclosure.
Figure 4:
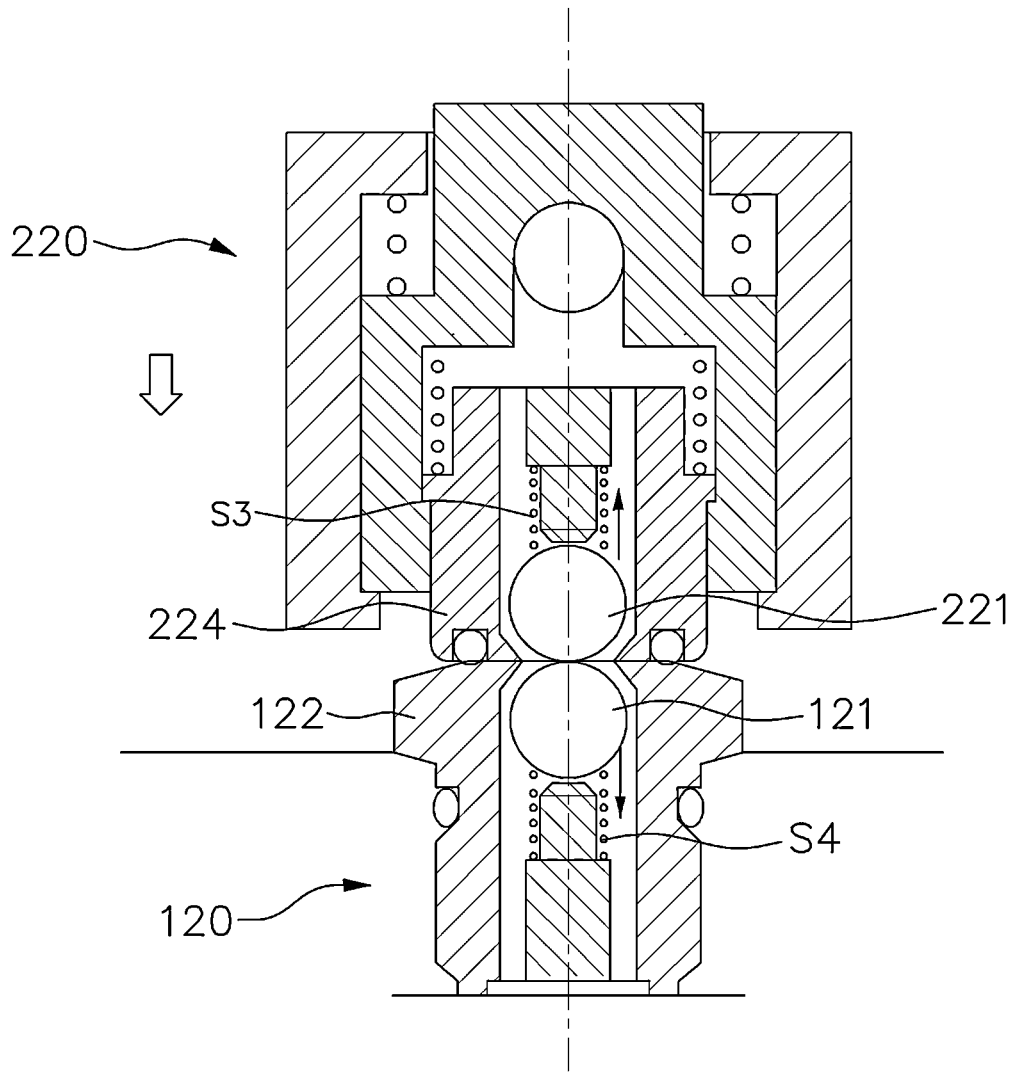

As illustrated in FIG. 3 and FIG. 4, the second valve body 220 is moved downward so that the first check ball 121 and the second check ball 221 are in contact with each other and the first check ball 121 and the second check ball 221 are pushed (see FIG. 3). Furthermore, as the second elastic body S2 and the fourth elastic body S4 are compressed, the first check ball 121 and the second check ball 221 are respectively inserted inside the first valve body 120 and the second floating body 224, and the flow path of the first valve body 120 and the flow path of the second valve body 220 are started to be connected to each other (see FIG. 4). Meanwhile, in a state in which the first check ball 121 and the second check ball 221 are fully inserted inside the first valve body 120 and the second floating body 224, the upper surface of the valve body head 122 and the lower surface of the second floating body 224 are in close contact with each other.

Figure 5:
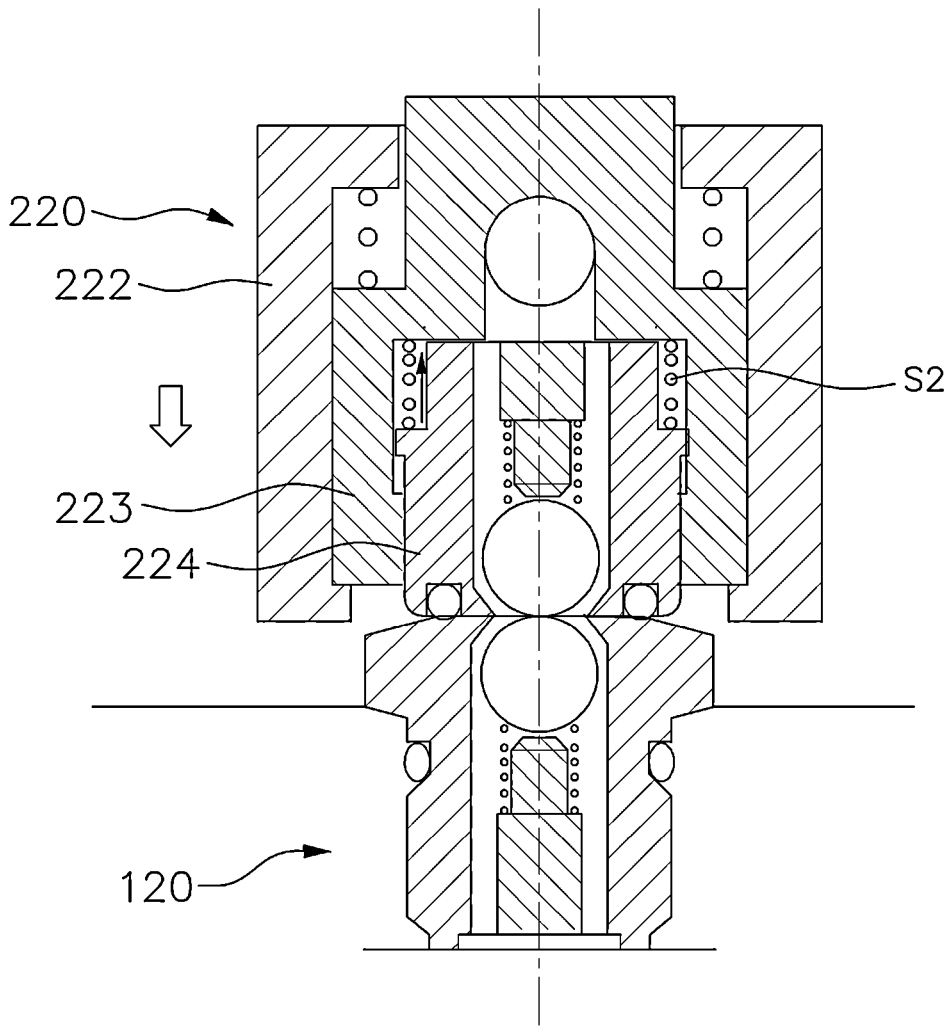
Figure 6:
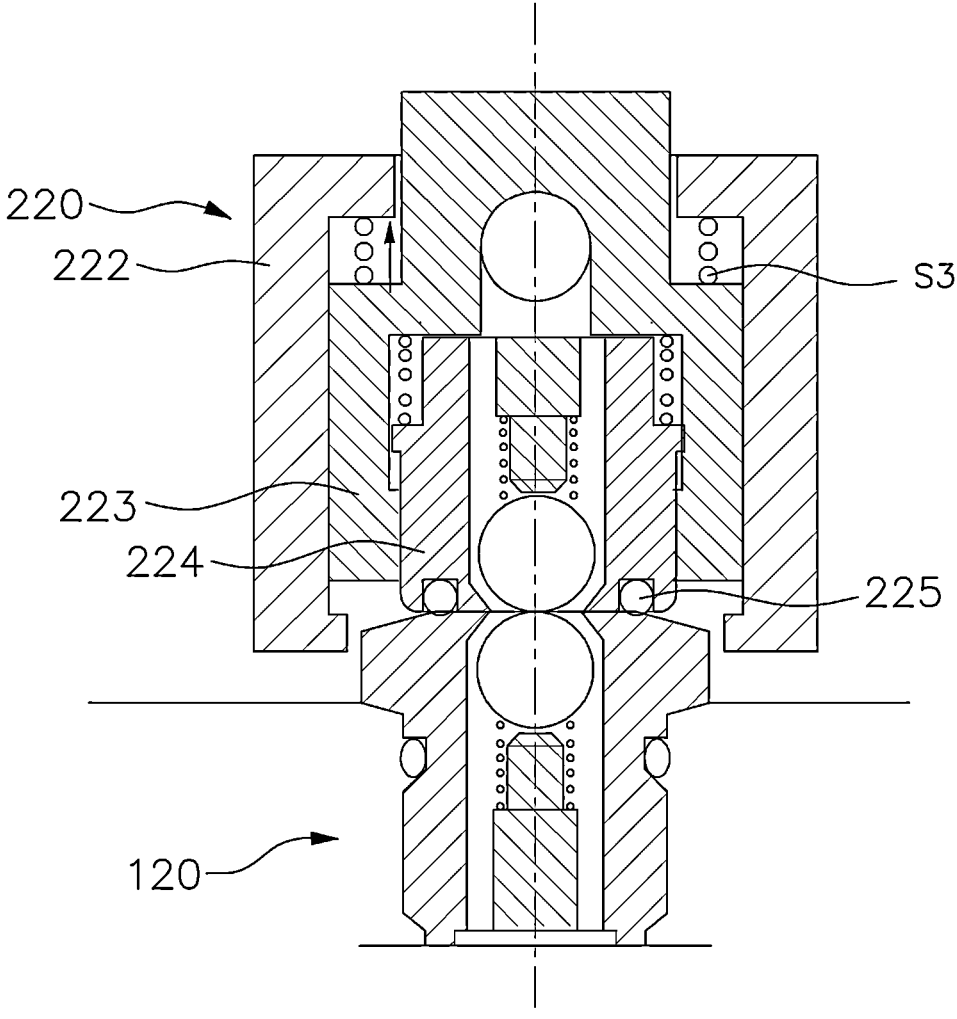

Next, as illustrated in FIG. 5 and FIG. 6, as the second valve body 220 continues to move downward, the first elastic body S1 is compressed, the second floating body 224 is inserted inside the first floating body 223, and the first floating body 223 is inserted inside the main body 222, so that the flow path of the first valve body 120 and the flow path of the second valve body 220 are fully connected to each other. Meanwhile, in a state in which the flow path of the first valve body 120 and the flow path of the second valve body 220 are connected to each other, the airtightness effect may be increased by the first sealing member 225 provided between the contact surface of the first valve body 120 and the first floating body 223.

The disconnection of the first valve body 120 and the second valve body 220 is performed in the reverse order of the connection process. As the first valve body 120 and the second valve body 220 are spaced apart from each other, each of the check balls 121 and 221 is pulled outward, so that the flow paths of each of the valve bodies 120 and 220 are blocked.

Meanwhile, in the present embodiment, it is described that the first coupling member 110 having the first valve body 120 and the second coupling member 210 having the second valve body 220 are respectively provided at the utility receiving end and the utility supplying end. However, the first coupling member 110 and the second coupling member 210 are capable of being respectively disposed at the utility supplying end and the utility receiving end. Furthermore, the first valve body 120 and the second valve body 210 are capable of being connected to each other by fixing any one of the first coupling member 110 and the second coupling member 210 and moving other one of the first coupling member 110 and the second coupling member 210, or the first valve body 120 and the second valve body 210 are capable of being connected to each other by moving the first coupling member 110 and the second coupling member 210 together.

The specific embodiment of the present disclosure is described in detail above. However, the present disclosure is not limited to the specific embodiment. It would be apparent to a person of ordinary skill in the art that various modifications to the present disclosure are possible within the scope of the technical idea of the present disclosure.

What is claimed is:

1. An automatic coupler for supplying a utility, the automatic coupler comprising:
   a first coupling member provided on any one of a utility supplying end or a utility receiving end;
   a first valve body provided in the first coupling member and provided with a first check ball elastically supported, to perform an opening and closing of a flow path by the first check ball;
   a second coupling member provided on the other one of the utility supplying end or the utility receiving end and configured to be coupled to the first coupling member; and
   a second valve body provided in the second coupling member and provided with a second check ball elastically supported, to perform an opening and closing of a flow path by the second check ball,
   wherein the second valve body comprises:
   a main body;

a first floating body elastically supported to the main body; and a second floating body elastically supported to the first floating body so that a portion of the second floating body protrudes outside the first floating body, the second floating body elastically supporting the second check ball so that a portion of the second check ball protrudes outside the first floating body.

2. The automatic coupler of claim 1, wherein the second valve body is provided such that the second floating body protrudes by a predetermined height with respect to a contact surface of the first floating body in contact with the first valve body, and the second check ball is provided to protrude higher than the height of the second floating body.

3. The automatic coupler of claim 1, further comprising a sealing member provided on at least one of two contact surfaces of the first valve body and the second valve body facing each other for maintaining airtightness.

4. The automatic coupler of claim 1, further comprising:

a first elastic body elastically supporting the main body and the first floating body;

a second elastic body elastically supporting the first floating body and the second floating body; and a third elastic body elastically supporting the second floating body and the second check ball, wherein an elastic modulus of the first elastic body is larger than an elastic modulus of the second elastic body, and the elastic modulus of the second elastic body is larger than an elastic modulus of the third elastic body.

5. The automatic coupler of claim 4, wherein the second valve body further comprises a valve stem fixed to the second floating body to support the third elastic body.

\* \* \* \* \*